United States Patent [19]

Boggs et al.

[11] 4,034,798

[45] July 12, 1977

[54] INTEGRALLY CAST BEARING, METHOD AND APPARATUS FOR MAKING SAME

[75] Inventors: Roger L. Boggs, Tazewell County; Harold L. Reinsma; Glenn R. Gobble, both of Peoria County, all of Ill.

[73] Assignee: Caterpillar Tractor Co., Peoria, Ill.

[21] Appl. No.: 709,149

[22] Filed: July 28, 1976

Related U.S. Application Data

[62] Division of Ser. No. 532,762, Dec. 16, 1974, Pat. No. 3,995,357.

[51] Int. Cl.² .......................................... B22D 15/02
[52] U.S. Cl. ..................... 164/281 R; 164/283 MT; 164/85; 164/338 M; 164/348; 164/DIG. 2
[58] Field of Search .......... 164/86, 98, 274, 283 M, 164/283 MT, 338 M, 348, DIG. 2, 251, 338 R, 338 H, 85, 281; 219/10.79

[56] References Cited

U.S. PATENT DOCUMENTS

| 1,748,851 | 2/1930 | Smith | 164/338 M X |
| 1,986,544 | 1/1935 | Theuer | 164/338 R X |
| 2,288,041 | 6/1942 | Sowes | 219/10.79 X |
| 3,342,252 | 9/1967 | Wood et al. | 164/283 M |

FOREIGN PATENT DOCUMENTS

| 402,443 | 9/1924 | Germany | 164/338 M |

*Primary Examiner*—Ronald J. Shore
*Attorney, Agent, or Firm*—Phillips, Moore, Weissenberger, Lempio & Majestic

[57] ABSTRACT

The invention relates to a process for forming a part including a bore with a bearing integrally cast thereto, the thus formed part and apparatus for this forming the part. The process includes hot machining a bore into a billet in a non-oxidizing atmosphere and introducing molten bearing material, e.g., molten bronze about a mandrel positioned in the bore while maintaining the billet, the mandrel and the bearing material in the non-oxidizing atmosphere. The mandrel is drawn from the bore while the bearing material is cooled by cooling and solidifying means therein adjacent an end of the mandrel which is last to exit the bore. The cooling is sufficient to progressively solidify the material as the mandrel is drawn through it and out of the bore. The mandrel further preferably includes heating means therein intermediate the cooling and solidifying means and the other end thereof to maintain the material in a liquid state until the cooling and solidifying means passes there adjacent as the mandrel is drawn out of the bore.

2 Claims, 3 Drawing Figures

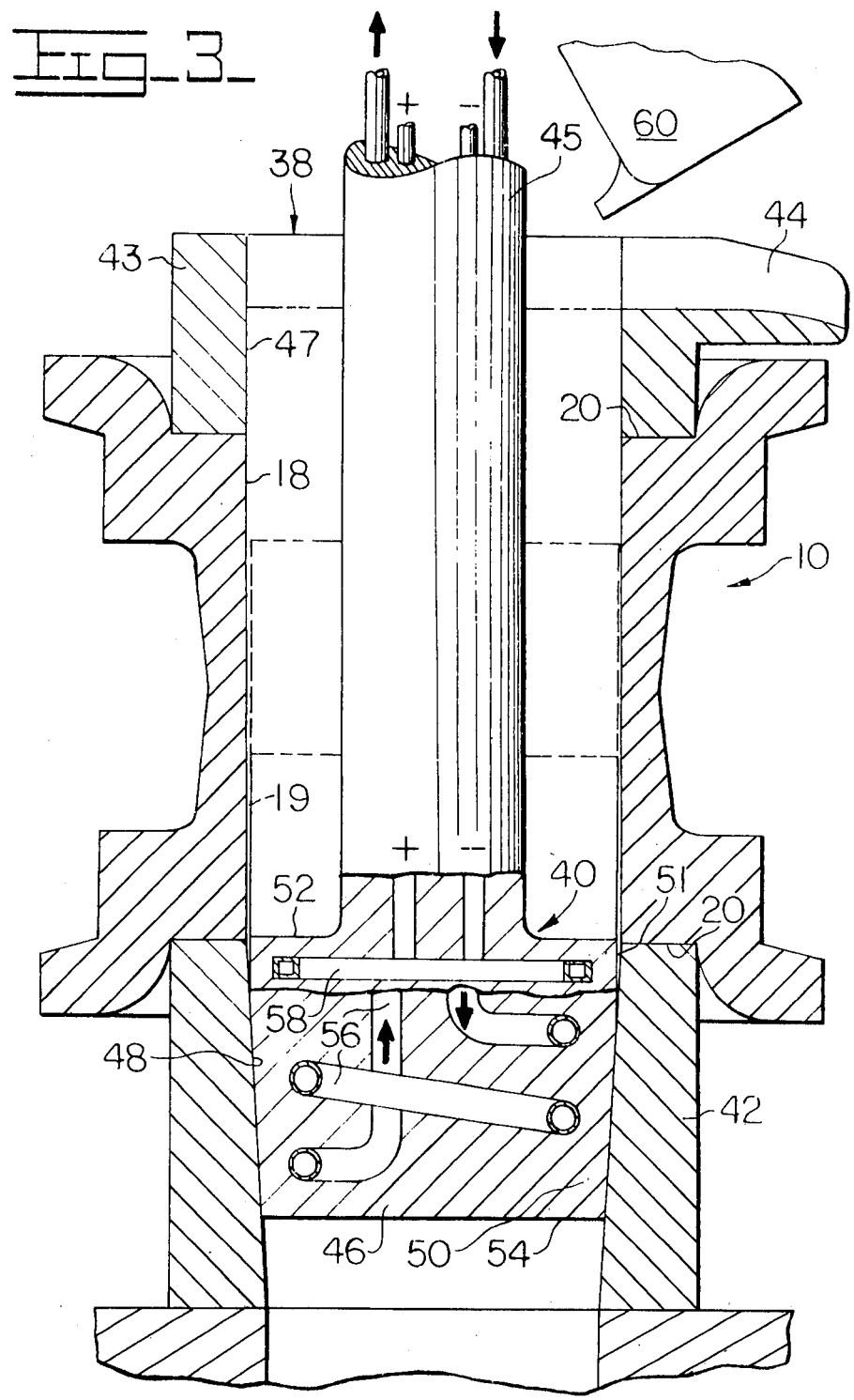

INTEGRALLY CAST BEARING, METHOD AND APPARATUS FOR MAKING SAME

This is a division of Ser. No. 532,762, filed Dec. 16, 1974 now U.S. Pat. No. 3,995,357.

BACKGROUND OF THE INVENTION

The invention relates to a process for forming a part including a bore with a bearing integrally cast therein. The invention also relates to the resulting bearing and to a mandrel and to associated apparatus particularly adapted to produce such a bearing. Such bearings are particularly useful in track rollers utilized with heavy duty earth moving equipment.

Track rollers on track type tractors typically utilize a pair of such bearings to absorb both radial and axial loads, which in such equipment can be severe. Each bearing takes the form of an axially directed sleeve portion to which is joined a radially directed flange portion. The bearings rotatably support a track roller on a shaft such that both radial and axial loads are satisfactorily accomodated.

Some prior art bearings have taken the form of integrally cast units wherein the entire bearing includes a sleeve portion which transcends to a radial flange or thrust surface portion. These prior art bearings have not proven to be entirely satisfactory in view of the relatively high cost incident to casting the integral thrust surface portion. Also, it has been generally necessary to heat up the part to which the bearing is to be cast after the part has been formed and quenched to a desired hardness.

One solution to this problem is the construction described in U.S. Pat. No. 3,624,881, issued Dec. 7, 1971 to Brown et al and assigned to the assignee hereof. This solution takes the form of a two piece bearing joined into a unitary whole by the process of friction welding.

A problem with a friction welding construction is engendered by the necessity of properly indexing the bearings within their supporting bushings so as to insure alignment of the oil holes in their respective elements. While this is not a problem in all cases, it is in some, and more particularly in the cases where small shafts are concerned. Another problem is that a failure to provide alignment of the oil holes between the oil reservoir containing support bushing and the bearing will tend to cut off the supply of necessary lubricant and result in damage to the bearing, bushing and shaft.

Another solution to the problem is the construction described in U.S. Pat. No. 3,795,428, issued Mar. 5, 1974 to Paine et al and assigned to the assignee hereof. This solution takes the form of a two piece interlocked support/thrust bearing. The interlocking means serves to join the pieces into a unit and also serves to prevent relative rotation between the pieces.

Problems with the two piece interlock support/thrust bearings are engendered by the case that must be taken to make them interlocking and the inherent cost in so formulating them. Also, costs of assembly are somewhat higher than desirable. Finally, under the very high weight of modern-day track roller utilizing vehicles, larger and more durable track roller bearings are desirable, as are inexpensive methods and apparatus to formulate them.

Accordingly, it is an object of the present invention to provide an inexpensive process for forming a rugged part such as a roller bearing, wherein the bearing is integrally bonded to the bore of a track roller and wherein production of the part is relatively inexpensive in that it requires only a single heating of a billet from which the part is formed.

SUMMARY OF THE INVENTION

In one sense, the invention comprises a process for forming a part including a bore with a bearing therein. The process comprises hot machining a bore into a billet in a non-oxidizing atmosphere. Molten bearing material is introduced about a mandrel positioned in the bore while the billet, the mandrel and the bearing material are maintained in the non-oxidizing atmosphere. The mandrel is drawn from the bore while the bearing material is cooled adjacent an end of the mandrel which exits the bore last sufficiently to progressively solidify the material as the mandrel is drawn through the material and out of the bore.

In another sense, the invention comprises a part, including a bore therethrough and a bearing solidified and bonded to said bore, said part being produced by the process described immediately above.

In yet another sense, the invention comprises a mandrel positionable in a bore, a bore facing surface of said mandrel being adapted to be spaced from said bore a distance geneally equal to the thickness of a molten material to be cast onto said bore. The mandrel comprises cooling and solidifying means therein, adjacent the one end thereof which exits said bore last when said mandrel is drawn therefrom, to progressively cool and solidify said material as said mandrel is drawn out of said bore. The mandrel further includes heating means therein intermediate said cooling and solidifying means and the other end thereof to maintain said material in a liquid state until said cooling and solidifying means passes through adjacent as said mandrel is drawn out of said bore.

BRIEF DESCRIPTION OF THE DRAWINGS

The invention will be better understood by reference to the drawings, wherein:

FIG. 3 illustrates in a sectional view in a vertical plane a track roller with the apparatus of the present invention for integrally casting the bearing thereupon.

DETAILED DESCRIPTION OF THE PREFERRED EMBODIMENTS

Figure 1:
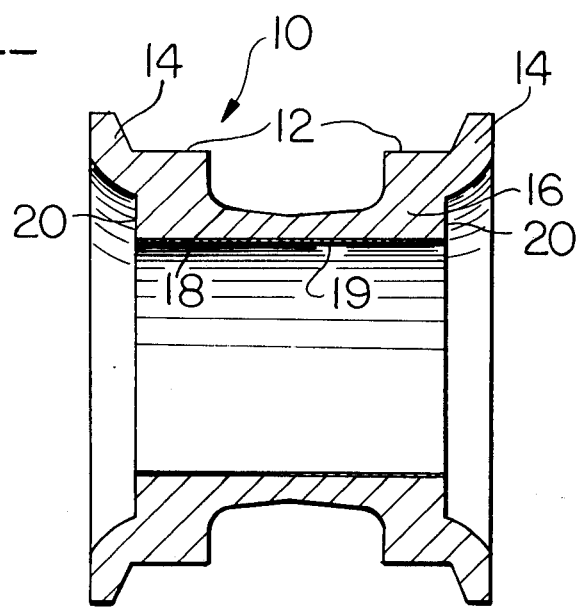
FIG. 1 illustrates in a cross-sectional view a track roller and bearing of the present invention to which an integrally cast bearing has been attached by the method of the present invention.

A track roller 10 as shown in FIGS. 1 and 3 includes a pair of chain supporting treads 12 and guide flanges 14 that are supported by an integrally formed hub portion 16 which has an axial bore 18. At the ends of the bore and of an integrally formed bearing 19 are a pair of relieved end surfaces 20 which afford suitable means for rotatably supporting the roller and mounting necessary seals and thrust bearings, not illustrated, thereto.

Figure 2:
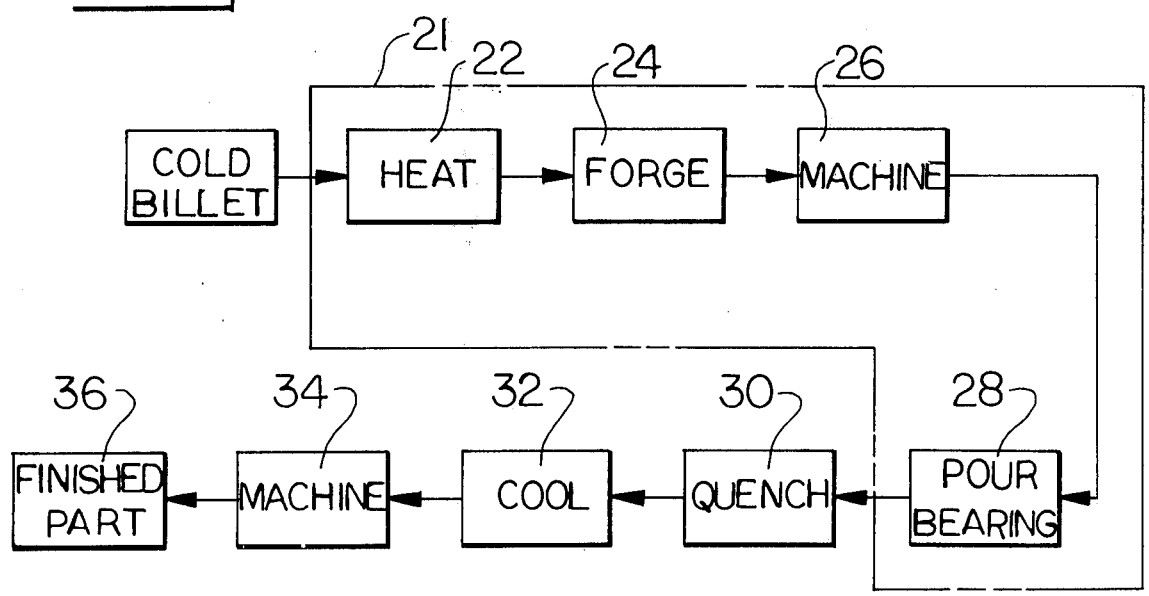
FIG. 2 illustrates in flow diagram the steps involved in the method of the present invention for integrally casting a bearing.

FIG. 2 illustrates in a typical flow diagram a preferred embodiment of the process for producing a track roller or a like part with a bearing cast integrally therein. the steps shown within the L-shaped box 21, namely the steps of heating 22, forging 24, machining 26 and pouring of the bearing 28 are each accomplished in a protective, controlled atmosphere. The protective controlled atmosphere is a non-oxidizing atmosphere which prevents oxidation of the surface to which the bearing is to be cast, so that efficient and integral sealing of the bearing 19 to the bore 18 results. The prevention of oxidation insures a complete bond between the bearing and the bore.

A billet of the proper size to produce the desired roller 10 is heated to a forging or forming temperature (generally 650° to 1500° C) in the heating step 22. At this temperature the billet is readily formed by dies in the forging step 24 into a desired shape, e.g., that of the track roller. The forging or forming takes place, as illustrated diagramatically, by the box 24. The still-hot part is then hot machined in the machine step 26 by boring, broaching, or the like to produce the bore 18 against which the bearing 19 is to be cast. Other machining may also take place in the machine step 26, such as finishing of the end surfaces 20 and the like. The machining is generally accomplished at a temperature above the melting point of the bearing material from which the bearing is to be formed.

After the forming and machining steps 24 and 26 are completed, the bearing 19 is cast by pouring a bearing material into the part and about a suitable mandrel. The temperature of the part during the pouring of the bearing material is maintained at a temperature above the melting point of the bearing material.

Thus, the billet is heated only a single time and the steps within L-shaped box 21 are each carried out on the hot billet without intermediate cooling and reheating thereof.

Typical bearing materials utilized for track roller bearings include bronze. The particular temperature above which a track roller 10 should be kept differs depending upon the particular composition of the bronze or other bearing material which is utilized. For example, if the bronze is 90% copper and 10% tin, the temperature should be kept above about 1010° C. If the composition is 80% copper and 20% tin, the temperature should be kept above about 900° C. If the composition comprises 75% copper to 25% tin, the temperature should be kept above about 800° C. To prevent local solidification of bearing material it is preferred that the temperature be kept at least about 15° C above the melting point of the bearing material.

Generally, the hot machining and the pouring of hot molten material about a mandrel takes place at temperatures within the range from about 650° C to about 1500° C.

After the bearing has been cast in place within the bore 18 the track roller 10 is generally but not invariably hardened by quenching in quenching step 30 as by plunging it into fluid and then is allowed to cool as in cooling step 32. After the part is cooled, the bearing can be machined as illustrated at machine step 34, if desired, to a finished diameter, thereby leading to a finished part 36.

The bearing pouring apparatus 38 of the preferred embodiment of the invention, along with the preferred embodiment of the mandrel 40 of the present invention, are illustrated in FIG. 3. The bearing pouring apparatus comprises an upright cylindrical base structure 42 upon which one of the end surfaces 20 of the track roller 10 is placed in a close fitting, supporting relationship. A ring-like member 43 including an overflow trough 44 is positioned upon the upper end surface 20 of the track roller to facilitate pouring and removal of molten material used in casting the bearing 19. The mandrel includes at one end thereof a shaft 45 and at the other end thereof a head 46. The mandrel is lowered through aligned bores 47 of the ring-like member 43, bore 18 of the track roller 10, and bore 48 of the cylindrical base 42. The base bore 48 is tapered to mate with a tapered end 50 of the head 46 to form a relatively fluid-tight joint therebetween and to center the mandrel relative to the aligned bores 47, 18 and 48. The other end 52 of the head 46, adjacent where the shaft 45 attaches thereto, the tapering of the tapered end 50 ceases and a bearing material heating section 51 of the mandrel is defined between the tapered end and the shaft portions thereof. The diameter of the bearing material heating section of the mandrel is such as to provide a space between it and the bore 18 approximately equal to the thickness of the bearing which is to be cast therebetween.

Within the mandrel 40 adjacent the one end 54 thereof and in the tapered end 50 thereof are the cooling coils 56. Above the cooling coils, intermediate said cooling coils and the other end 52 of the tapered end 50 (in the bearing material heating suction 51) is the heating coil 58 which typically is a conventional induction heating unit.

In operation, the mandrel 40 is inserted through the bores 47, 18 and 48 until the tapered end 50 thereof binds within the bore 48. Then the molten bearing material, e.g., molten bronze, is poured as from the ladle 60 into the space between the shaft 45 and the bore 18. The mandrel is then removed by impelling the shaft 45 upwardly. The heating coil 58 is kept at a high enough temperature so that the bearing material thereadjacent remains molten. The cooling coils 56 are kept cooled enough so that the bearing material solidifies as the tapered end 50 of the mandrel 40 passes opposite it. Thereby, due to the progressive cooling, the bearing material is solidified to bond it in place and make it integral with the bore 18 from the bottom thereof upwardly as the mandrel 40 is drawn upwardly through the bore and then finally out of the bore. Meanwhile, the excess molten material between the shaft 45 and the bore is drawn upwardly by the other end 52 of the tapered end 50 of the mandrel, up into the ring-like member 43 and out of the trough 44 for reuse. The relatively large mass of molten bronze in the bore about the shaft 45 helps maintain the bronze in a molten state until the mandrel is retracted from the bore.

While the invention has been particularly described with respect to use with a track roller bearing, the process, product and apparatus of the present invention are also useful to provide other materials cast integrally within bores.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. In an apparatus for casting a bearing integrally with a bore including a mandrel positionable in the bore, a bore facing surface of said mandrel being spaced from said bore a distance generally equal to the thickness of a molten material to be cast onto the bore, an improvement comprising:

cooling and solidifying means completely internal of said mandrel adjacent an end thereof which exits said bore last when said mandrel is drawn therefrom to progressively cool and solidify said material as said mandrel is drawn out of said bore by cooling said last exiting end of said mandrel; and heating means in said mandrel intermediate said cooling and solidifying means and the other end thereof to maintain said material in a liquid state until said cooling and solidifying means passes thereadjacent as said mandrel is drawn out of said bore.

2. The apparatus of claim 1, including extending from the other end of said mandrel a shaft, a bore facing surface of said shaft being generally further spaced from said bore than the bore facing surface of said mandrel, said mandrel being positionable adjacent one end of said bore with said shaft in said bore, the space between said bore facing surfaces of said shaft and said bore being adapted to receive an excess of said molten material over that required to be cast onto said bore whereby as said shaft is drawn out of said bore with said mandrel following, said excess of said molten material is flowed out of said bore.

* * * * *